(12) United States Patent
McClanahan et al.

(10) Patent No.: US 9,283,975 B2
(45) Date of Patent: Mar. 15, 2016

(54) MODULAR CART

(71) Applicant: Unarco Industries LLC, Wagoner, OK (US)

(72) Inventors: Travis McClanahan, Ringgold, VA (US); David Klapper, Danville, VA (US); Jason Butler, Muskogee, OK (US)

(73) Assignee: Unarco Industries LLC, Wagoner, OK (US)

( * ) Notice: Subject to any disclaimer, the term of this patent is extended or adjusted under 35 U.S.C. 154(b) by 11 days.

(21) Appl. No.: 14/645,486

(22) Filed: Mar. 12, 2015

(65) Prior Publication Data

US 2015/0344052 A1  Dec. 3, 2015

Related U.S. Application Data

(60) Provisional application No. 62/005,375, filed on May 30, 2014.

(51) Int. Cl.
| | |
|---|---|
| *B62B 3/10* | (2006.01) |
| *B62B 3/02* | (2006.01) |
| *B62B 3/14* | (2006.01) |
| *B62B 5/06* | (2006.01) |

(52) U.S. Cl.
CPC ... *B62B 3/02* (2013.01); *B62B 3/10* (2013.01); *B62B 3/14* (2013.01); *B62B 3/1476* (2013.01); *B62B 5/061* (2013.01)

(58) Field of Classification Search
CPC ..................................................... B62B 5/0083
USPC .............. 280/47.18, 47.2, 30, 654, 655, 651, 280/638–639
See application file for complete search history.

(56) References Cited

U.S. PATENT DOCUMENTS

| | | | |
|---|---|---|---|
| 2,904,237 A | | 9/1959 | Wasyluk |
| 3,361,438 A | | 1/1968 | Davis |
| 4,165,088 A | * | 8/1979 | Nelson ....................... 280/47.35 |
| 5,054,732 A | | 10/1991 | Sukup |
| 6,206,385 B1 | * | 3/2001 | Kern et al. .................. 280/47.35 |
| 2005/0151336 A1 | * | 7/2005 | Neuman ..................... 280/79.11 |
| 2013/0200585 A1 | * | 8/2013 | Hoeper et al. ............... 280/79.2 |
| 2014/0084036 A1 | | 3/2014 | Hemann |
| 2014/0217690 A1 | * | 8/2014 | Schumaker et al. ........ 280/47.35 |

* cited by examiner

*Primary Examiner* — John Walters
*Assistant Examiner* — James Triggs
(74) *Attorney, Agent, or Firm* — Andrus Intellectual Property Law, LLP

(57) ABSTRACT

A modular cart includes a cart frame with a top and a bottom. A platform is secured to the top of the cart frame. Wheels are secured to the bottom of the cart frame. Receiver assemblies are secured to the cart frame. A cart module includes at least one handle with a lower end and an upper end. A shank is located at the lower end. The shank is removably secured within a receiver assembly secured to the cart frame.

19 Claims, 13 Drawing Sheets

MODULAR CART

CROSS REFERENCE TO RELATED APPLICATION

This application relates to and claims priority from U.S. Provisional Application Ser. No. 62/005,375 filed on May 30, 2014, which is hereby incorporated by reference in its entirety.

FIELD OF THE DISCLOSURE

The present disclosure is related to the field of conveyance apparatus. More specifically, the present disclosure is related to a cart with modular attachments to reconfigure the cart for various specialty purposes.

BACKGROUND

Wheeled carts facilitate the transport of objects. Exemplarily in a retail store setting, carts are used by customers to temporarily hold and transport goods to be purchased and/or purchased goods either within the retail store facility or to the customer's vehicle in a parking lot. Further, employees may use carts to transport goods within the retail store setting to move or to restock goods, particularly in the sale of seasonal goods for which temporary displays of goods are established within the retail store setting.

In a retail store setting of a specialty store, the goods may be all of a similar type, size, or construction and therefore a single type or style of cart serves all of the transport needs of both customers of the store and the employees moving the goods within the facility. However, in retail store settings that offer a wide variety of products, including products of greatly varying size, weight, or rigidity, a plurality of specialty carts may be employed by the retail store facility to address transport needs. The management of multiple cart types creates logistic difficulties as these diverse types of carts must be managed, stored, and maintained, each specialty cart having different such requirements. These logistics are further challenged when one or more specialty cart type is adapted for use with a seasonal or time sensitive group of products and therefore specialized carts for these products are only needed during a portion of the year, or on a cyclical basis within a year. During periods of non-use, these specialty carts must be stored at further cost and inconvenience to the retail store facility.

The inventors have discovered that due to the specialty nature of some cart types, and the limited actual use of these specialty carts, in an effort to minimize costs, these carts may be constructed in manners that inhibit the maintenance and/or repair, or eliminate desirable but more expensive features or qualities from specialty carts.

Therefore, modular carts that are efficiently reconfigurable and/or maintained address a need that has been identified in the industry.

BRIEF DISCLOSURE

An exemplary embodiment of a modular cart includes cart frame. The cart frame includes a top and a bottom. A platform is secured to the top of the cart frame. A plurality of wheels are secured to the bottom of the cart frame. A plurality of receiver assemblies are secured to the cart frame. A cart module includes at least one handle. The at least one handle includes a lower end and an upper end. A shank is located at the lower end of the at least one handle. The shank is removably secured within a receiver assembly of the plurality of receiver assemblies.

An exemplary embodiment of a modular car system includes a cart base. The cart base includes a cart frame. The cart frame extends between a front end cap and a rear end cap. The cart frame includes a top and a bottom. A platform is secured to the top of the cart frame. A plurality of wheels are secured to the bottom of the cart frame. A plurality of receiver assemblies are secured to each of the front end cap and the rear end cap. The modular cart system further includes a plurality of cart modules. Each cart module of the plurality includes at least one handle having a lower end and an upper end. A shank is located at a lower end of the at least one handle. At least one member extends generally perpendicularly away from the upper end. The shank is configured be removably secured within a receiver assembly of the plurality of receiver assemblies.

An additional exemplary embodiment of a modular cart system includes a cart base. The cart base includes a cart frame which extends between a front end cap and a rear end cap. The cart frame includes a top and a bottom. The platform is secured to the top of the top frame. A plurality of wheels are secured to the bottom of the cart frame. A first plurality of receiver assemblies are secured to the front end cap. A second plurality of receiver assemblies are secured to the second end cap. A first cart module includes a first handle with a lower end and an upper end. The lower end includes a front shank. The first cart module further includes a second handle with a lower end and an upper end, the lower end includes a second shank. The first cart module includes a first bar secured between the upper ends of the first and second handles. A second cart module includes a third handle with a lower end and an upper end, the lower end includes a third shank. The second cart module further includes a fourth handle with a lower end and an upper end, the lower end includes a fourth shank. The second cart module further includes a second bottom secured between the upper ends of the third and fourth handles. The first cart module is selectively secured to the cart base by engagement of the first shank with a receiver assembly of the first plurality of receiver assemblies and engagement of the second shank with another receiver assembly of the first plurality of receiver assemblies. Upon removal of the first cart module, the second cart module is selectivity secured to the cart case. The second cart module is selectively secured to the cart base by engagement of the third shank with a receiver assembly of the first plurality of receiver assemblies and engagement of the fourth shank with a receiver assembly of the second plurality of receiver assemblies.

DETAILED DISCLOSURE

As disclosed in further detail herein, modularly constructed carts otter advantageous features which enable greater efficiencies in the use and maintenance of a stock of carts. The exemplary setting of a retail store facility is used herein for the purposes of context, although it will be recognized that other settings and uses may find similar advantages from embodiments of the modular carts as disclosed herein.

In a more specific exemplary embodiment, the retail store facility is a home improvement store with varying departments with a diverse array of products of differing size, shape, rigidity, or weight. These products may exemplarily include lumber or building materials, hand tools, power tools, major household appliances (e.g. washers, dryers, refrigerators, dishwashers), paint, cabinets, bathroom vanities, light fixtures and gardening supplies (e.g. bags of mulch, soil or landscape stone, retaining wall blocks, potted plants, trees, or shrubs, grass seed, and lawn and garden tools). It will be recognized that these examples of retail goods are merely exemplary and not intended to be limiting, while also providing an example of the wide array of physical properties found in goods to be moved by modular carts in such a home improvement store setting.

In currently available solutions, specialty flatbed carts, garden center wagons, lumber carts, flat-good carts, and traditional shopping carts may all be used in various departments within such a facility.

Figure 1A:
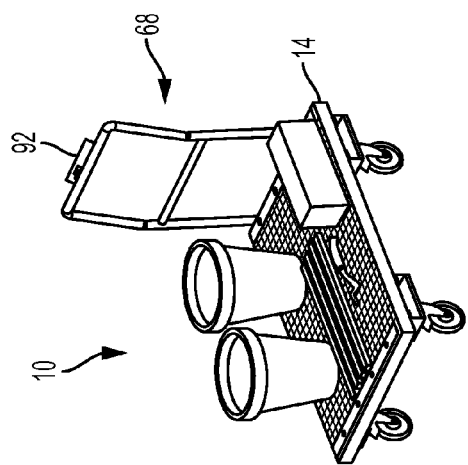
FIGS. 1A-D depict exemplary embodiments of modular carts.
Figure 1B:
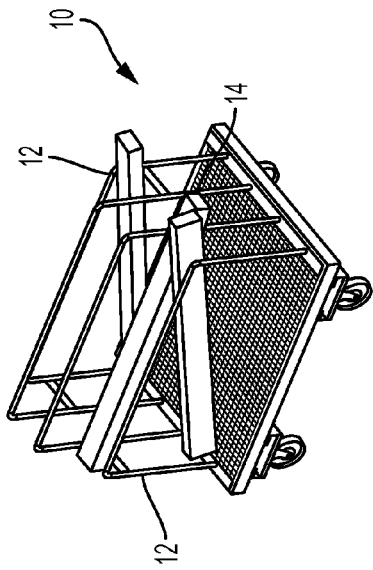
Figure 1C:
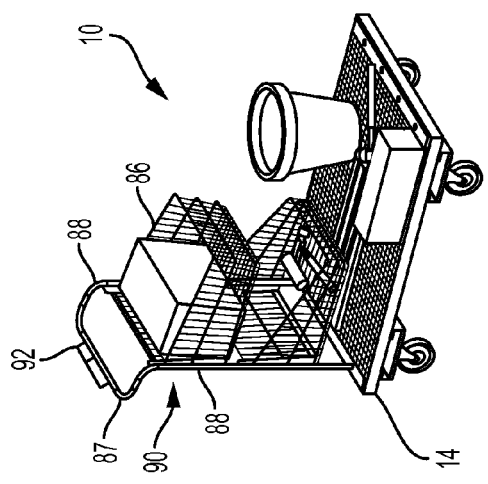
Figure 1D:
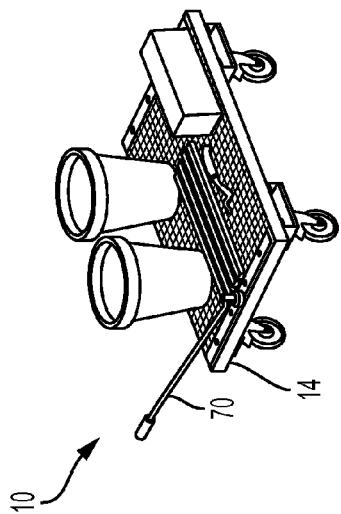

FIGS. 1A-D depict exemplary embodiments of various configurations of modular carts as disclosed in further detail herein. A person of ordinary skill in the art will recognize from the disclosure found herein other various configurations and uses apart from those explicitly shown in FIGS. 1A-D. FIG. 1A depicts an example of a shopping cart configuration. FIG. 1B depicts an exemplary embodiment of a flatbed cart configuration. FIG. 1C depicts an exemplary embodiment of a wagon cart configuration. FIG. 1D depicts an exemplary embodiment of a lumber cart configuration. These and other exemplary embodiments will be described in further detail herein.

Figure 4:
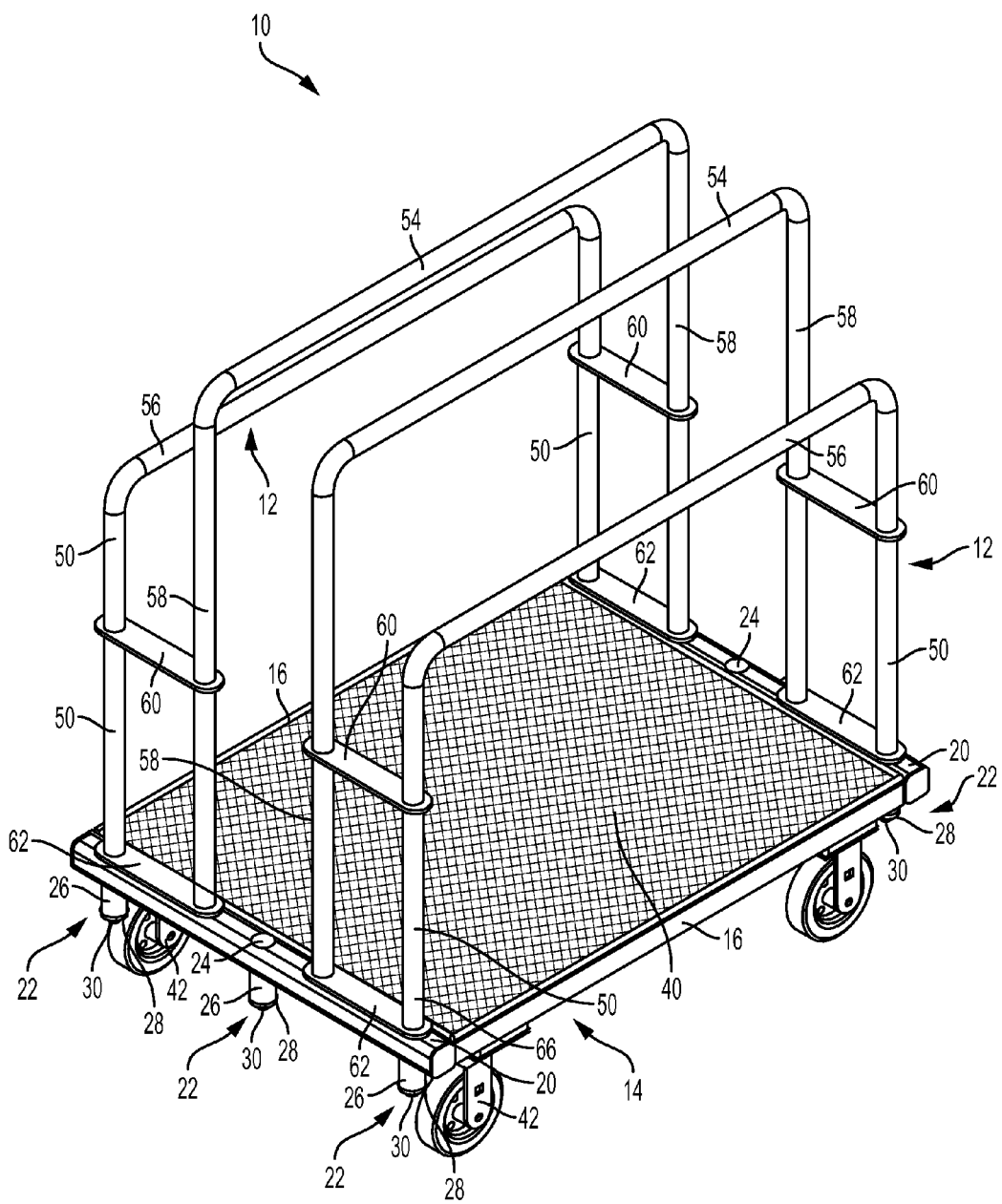
FIG. 4 depicts an additional exemplary embodiment of a modular cart.

FIG. 4 depicts a perspective view of one of the exemplary embodiments of a modular cart 10. The modular cart 10 is exemplarily configured in a lumber cart configuration through the connection of two lumber rack cart modules 12 to a cart base 14. Exemplary embodiments of modular carts 10 may include any number of components discussed herein. The cart base 14 includes a frame with elongated side rails 16 and end caps 20 which extends across the respective front and rear ends of the cart base 14.

Figure 6:
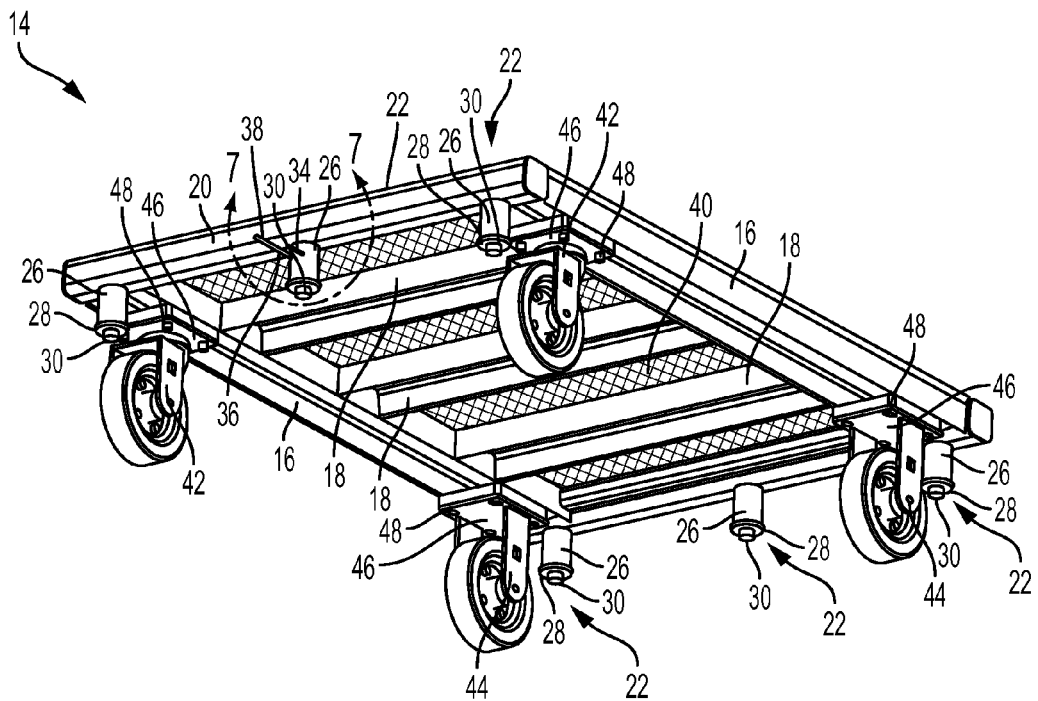
FIG. 6 is a bottom view of an exemplary embodiment of a cart base.

FIG. 6 further depicts a bottom view of an exemplary embodiment of a cart base 14. The plurality of cross beams 18 are parallel to the end caps 20 and offset from each other along the distance between the end caps 20. The ends of the cross beams 18 are attached to the elongated side rails 16. Additional cross beams 18 may also be located at the end caps 20. Alternatively, the cross beams 18 may be parallel with the elongated side rails 16. In this orientation, the ends of the cross beams 18 are attached to the end caps 20. It should also be known to one skilled in the art that the cross beams 18 may be orientated in any way when attached to the cart base 14. In the exemplary embodiments, the side rail 16, cross beam 18, and end caps 20 may be constructed of box tubing, C channel, L channel, or any other suitable shape and material known to those skilled in the art. In the exemplary embodiments, the side rails 16, cross beams 18, and end caps 20 the attached together by welding. However, those skilled in the art will recognize that these components may be fastened together by, but not limited to, screws, nuts and bolts, rivets and other fasteners.

A platform 40 is secured to the frame constructed of the side rails 16 and the cross beams 18. In an exemplary embodiment, the platform 40 is constructed of expanded metal mesh. Due to the cost constraints surrounding specialty carts as described above, often times, specialty carts are constructed with a solid sheet metal platform. While the solid sheet metal platform may provide initial durability and strength over other prior art cart designs, this sheet metal platform has been discovered by the inventors to impede efforts to refurbish or repair carts as the sheet metal impairs the heat treating techniques used to burn paint from the cart to be refurbished. The use of expanded metal mesh in this construction facilitates such techniques, improving the ability of the modular carts to be refurbished.

The exemplary embodiment of the cart base 14 is depicted with four wheels, including two castors 42 and two fixed wheels 44. It is to be recognized that in embodiments, more or fewer than four wheels may be used and in some embodiments, the number of wheels may be generally dependent upon the length of the cart base 14, the load capacity for which the modular cart 10 is designed, and/or the load capacity for which the wheels are rated. For instance, in an additional exemplary embodiment, a pair of fixed wheels of a diameter larger than those of the other wheels may be secured in a middle of the cart vase. This may exemplarily by used in conjunction with four castors. It will be recognized that any combination of castors and/or fixed wheels may be used.

The wheels are secured to the bottom of the cart base 14 with a wheel plate 46. The wheel plate 46 includes a plurality of holes dimensioned to receive threaded weld studs 48 that are secured to the bottom of the cart base 14. Threaded nuts (not depicted) engage the threaded weld studs 48 to secure the wheel plates 46 to the cart base 14. The use of threaded weld studs 48 further reduces the number of removable components that may be lost or damaged while facilitating ease of removal of the wheels for wheel maintenance, replacement, or for refurbishing of the cart base 14. Those skilled in the art will also recognize that other fasteners including, but not limited to screws, bolts and nuts, and rivets may be used to attach the wheel plate 46 to the cart base 14. While it is advantageous to fixedly attach the wheels to the cart base 14 as described above, it is further contemplated that the wheels may be removably attached to the cart base 14 to allow for other modular cart 10 embodiments and easy shipping of modular cart 10 components.

Figure 10:
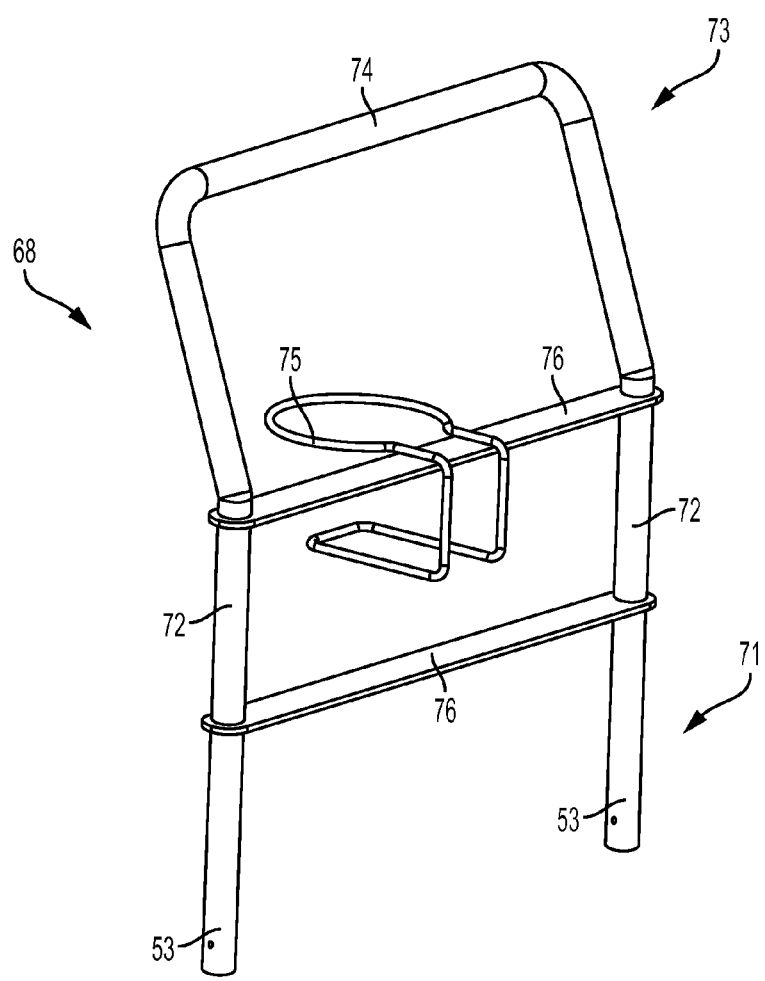
FIG. 10 depicts an exemplary embodiment of a flat cart module.
Figure 11:
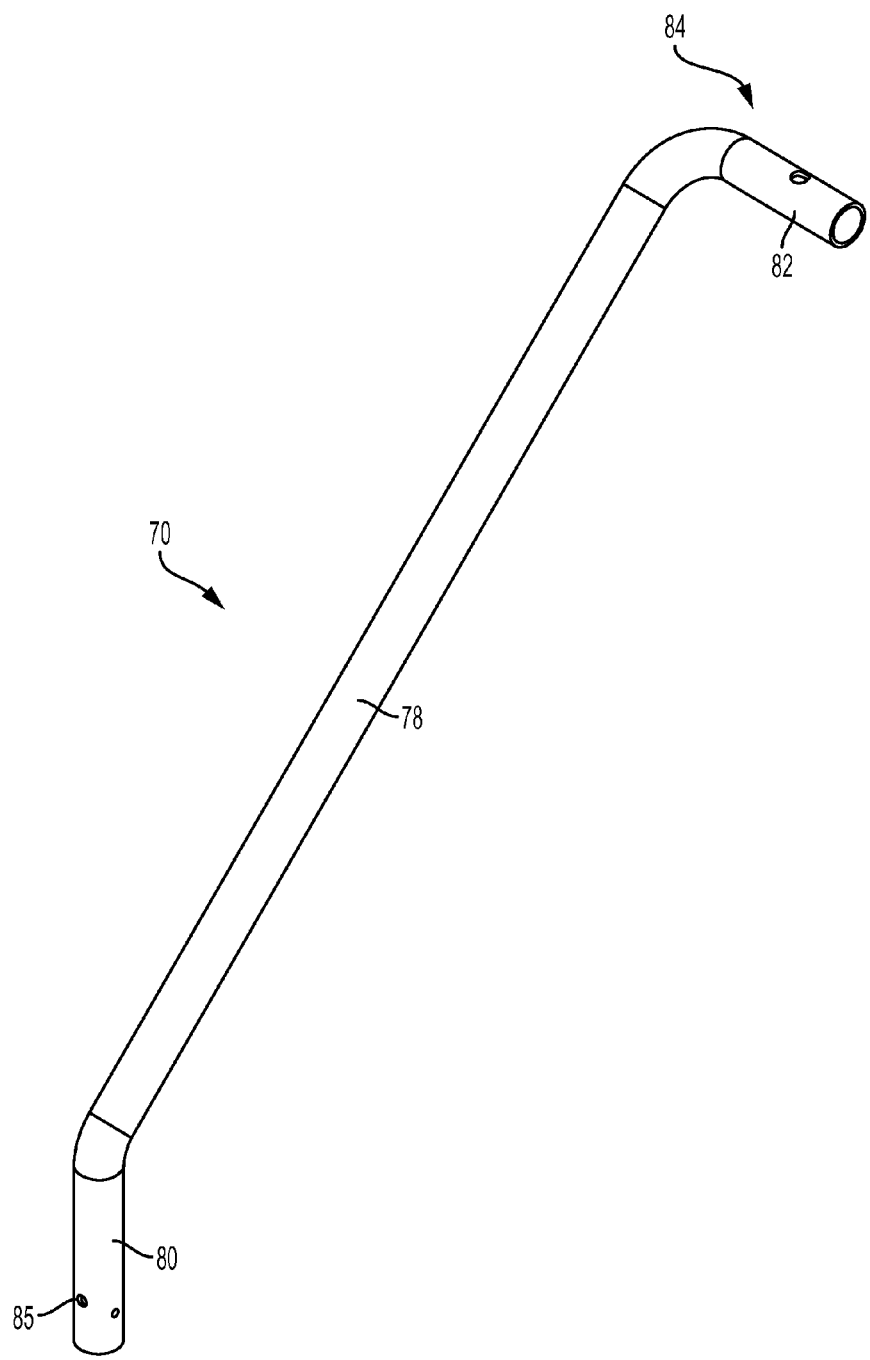
FIG. 11 depicts front, side, and top views of an exemplary embodiment of a cart base.

In exemplary embodiments, each end cap 20 includes a plurality of receiver assemblies 22 while the embodiment depicted in FIGS. 10 and 11 include three receiver assemblies 22 in each end cap 20. This is not intended to be limiting and any number of receiver assemblies 22 may be used in embodiments of the modular carts as disclosed herein. Additionally, while in embodiments the receiver assemblies 22 are depicted as being located at the relative front and rear ends of the cart base 14 (exemplarily in the end caps 20), it will be recognized that alternative embodiments may include receiver assemblies 22 located in other positions in the cart base 14. In a non-limiting example, receiver assemblies 22 may be located at the elongated side rails 16 of the cart base 14.

Figure 5:
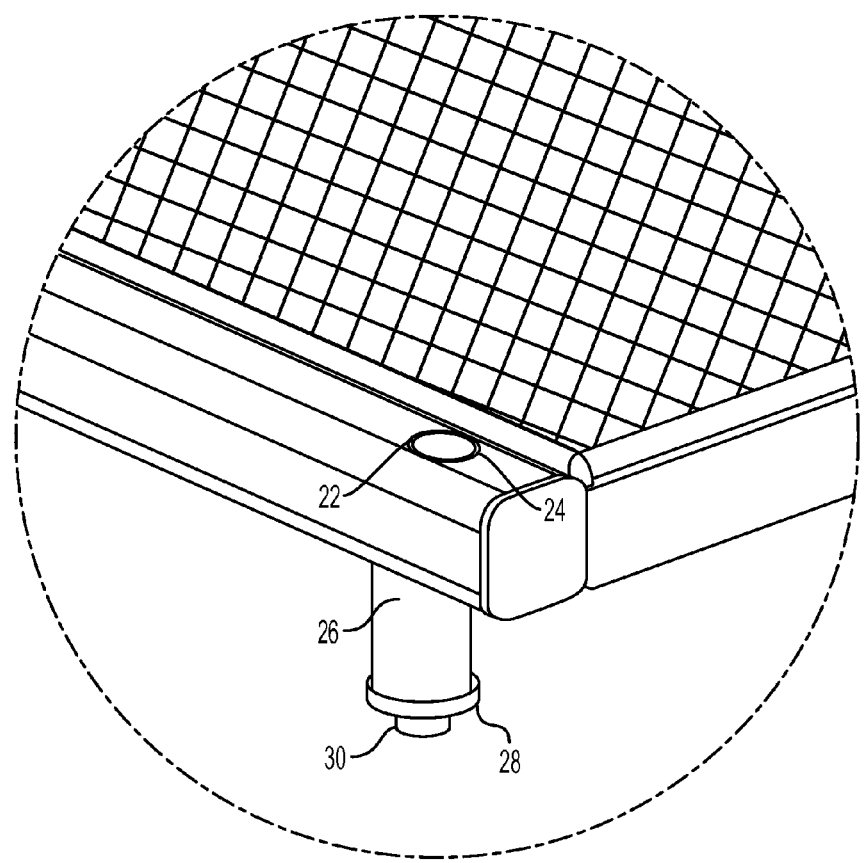
FIG. 5 is a close-up view of section 5-5 identified in FIG. 4.
Figure 7:
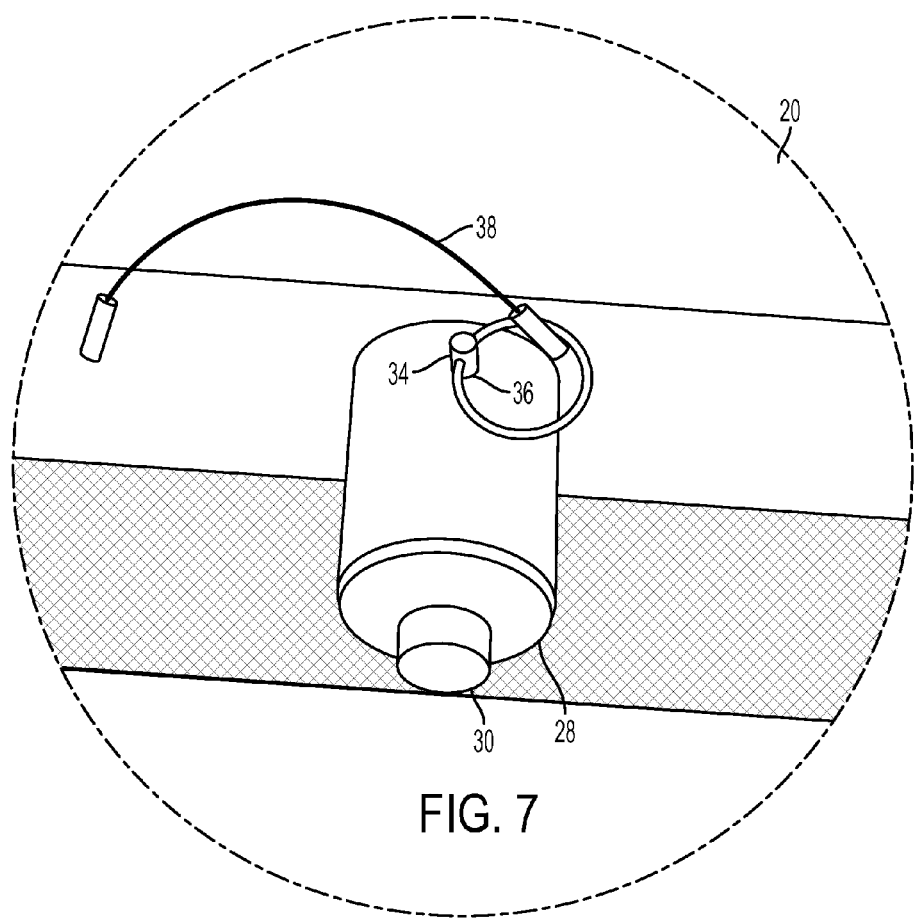
FIG. 7 is a close-up view of section 7-7 identified in FIG. 6.

The receiver assemblies 22 are exemplarily secured to the end caps 20 through holes 24 in the end cap 20. The receiver assemblies 22 include a receiver tube 26 and a handle stop 28. FIG. 5 is a close up view of an embodiment of a receiver assembly 22 in section 5-5 of FIG. 4. FIG. 7 is a close up view of an embodiment of the receiver assembly 22 in section 7-7 of FIG. 6. The receiver tubes 26 of the receiver assemblies 22 extend through the holes 24 in the end caps 20. The receiver tubes 26 may extend out of the holes 24 below the bottom of the end caps 20. In an exemplary embodiment, the receiver tubes 26 are approximately 4 inches long. The receiver assemblies 22 are capped at their lower most ends by respective handle stops 28. The handle stops 28 include a through hole configured to receive a screw 30. In an exemplary embodiment, the screw 30 is a socket head cap screw. Referring to FIGS. 4-8, the shank 53 exemplarily includes a threaded nut (not depicted) configured to receive the screw 30. The shanks 53 are inserted into the receiver tubes 26 of the receiver assemblies 22 until respective ends 32 of the shanks 53 engage the handle stops 28. In this manner, the handle stops 28 define the depths of the receiver assemblies 22 and establish the proper position in vertical space between the handle 50 and the cart base 14. In additional embodiments, engagement of the lower brace 62, particularly a bottom surface 64 of the lower brace 62 against the end cap 20 further defines the position of the handle 50 relative to the cart base 14. It will be recognized that in embodiments the lower brace 62 may perform this function without engagement between the end 21 and the handle stop 28.

Figure 8:
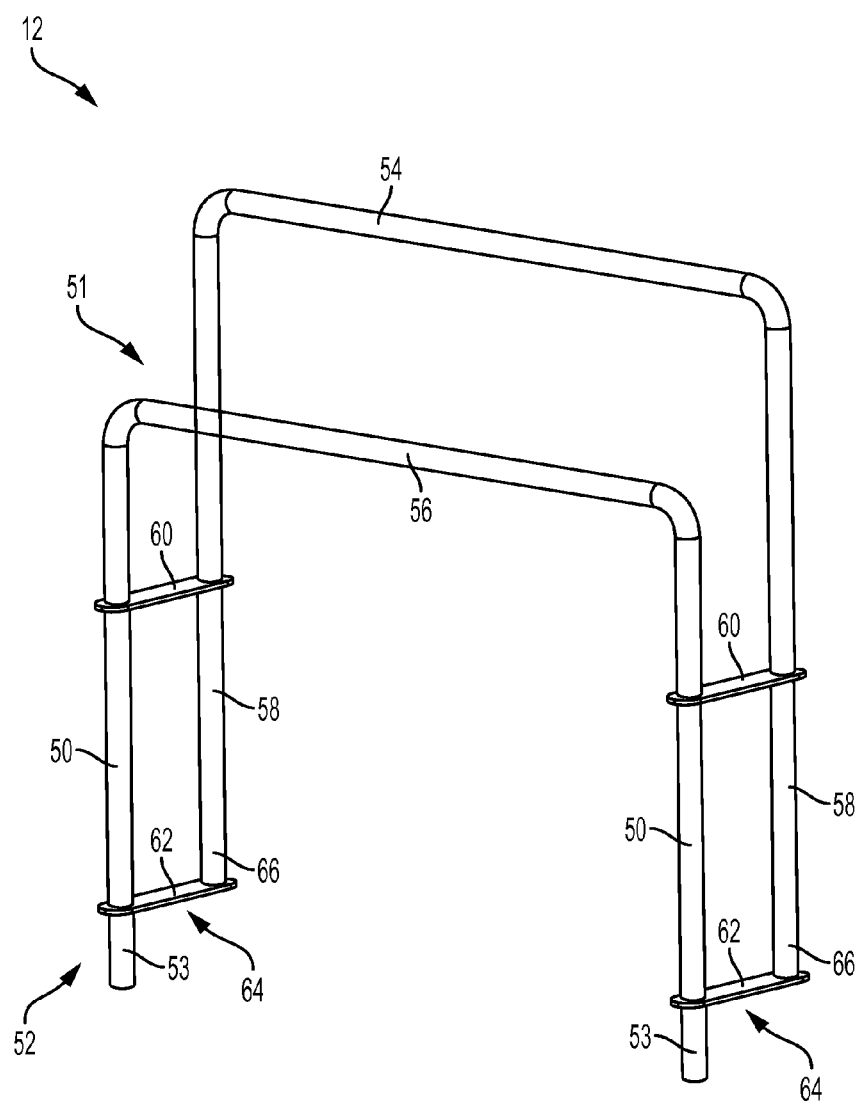
FIG. 8 depicts an exemplary embodiment of a lumber rack module.

Referring back to FIG. 4, the modular cart 10 is configured with a pair of lumber rack cart modules 12. The lumber rack cart modules 12 are secured to the cart base 14 as will be described in further detail herein. FIG. 8 depicts a detailed view of an exemplary embodiment of a lumber rack cart module 12. The lumber rack cart module 12, like other cart modules as disclosed herein, includes a handle 50 that is configured to have a lower end 52 inserted into at least one receiver assembly 22 and an upper end 51 configured to be grasped by a person using the modular cart 10. In an embodiment, the lower end 52 terminates in at least one shank 53. The at least one shank 53 is configured to be received by the receiver assembly 22 of the modular cart 10 as described herein The lumber cart module 12 exemplarily includes a high bar 54 and a low bar 56. The low bar 56 connects two handles 50 which are configured to be secured at the handle lower ends 52 to the receiver assemblies 22 in the cart base 14. Exemplarily, the shanks 53 are inserted into respective receiver assemblies 22 in each of the opposed end caps 20 such that the lumber rack cart module 12 spans the length of the cart base 14. Similarly, the high bar 54 is held in a vertical position by at least one high bar support 58. The high bar supports 58 are connected to the handles 50 by upper braces 60 and lower braces 62. The upper braces 60 and lower braces 62 rigidly secure the high bar supports 58 to the handles 50 such that the lumber rack cart module 12 is a unitary structure. The upper braces 60 and lower braces 62 are rigidly secured to the high bar supports 58 and the handles 50 by welds, screws, bolts and nuts, or other fasteners. The upper braces 60 and lower braces 62 in the exemplary embodiments are generally planar plates. In the exemplary embodiment, the upper brace 60 includes two apertures to receive the handle 50 and the high bar support 58. The apertures in the upper brace 60 are dimensioned such as to slidingly receive the handle 50 and high bar support 58. The upper brace 60 slidingly receives the handle 50 and high bar support 58 as the lower ends 52, 66 of the handle 50 and high bar support 58, respectively, are received through the apertures of the upper brace 60 and welded to the handle 50 and high bar support 58.

The lower brace 62 in the exemplary embodiment is also of generally planar plate construction. The lower brace 62 includes an aperture dimensioned such as to slidingly receive the lower end 52 of the handle 50. When the lower brace 62 slidingly receives the lower end 52 of the handle 50 and the lower end 52 of the handle 50 is inserted into the receiver assembly 22, the bottom surface 64 of the lower brace 62 engages the end cap 20. A lower end 66 of the high bar support 58 extends vertically from the lower brace 62. Additionally, a top surface 63 of the lower brace 62 exemplarily engages the lower end 66 of the high bar support 58. Alternatively, an additional aperture may be included in the lower brace 62 to slidingly receive the high bar support 58. As best seen in FIG. 4, the modular cart 10 includes two lumber rack cart modules 12 to construct a modular cart 10 in a lumber cart configuration.

Once the shank 53 is inserted into the receiver assembly 22, the screw 30 engages the nut and secures the shanks 53 with the receiver assembly 22. The receiver assembly 22, particularly in the interior diameter of the receiver tube 26 is dimensioned such as to slidingly receive the shank 53 to maintain a general orientation between the handle 50 and the cart base 14 (e.g. perpendicular) while including sufficient tolerance such that the handle 50 can easily be slidably inserted into the receiver assembly 22 not withstanding any coating such as paint or powder coating that may be applied to either the handle 50 or the receiver assembly 22. It is to be recognized that in embodiments, the receiver assembly 22 may define an angular relationship between the handle 50 and the cart base 14. It should also be known to those skilled in the art that the handle 50 may be attached to the cart base 14 in other ways, and the receiver tubes 26 and the shank 53 may take any shape, including, but not limited to, square, elliptical, or rectangular.

Figure 9:
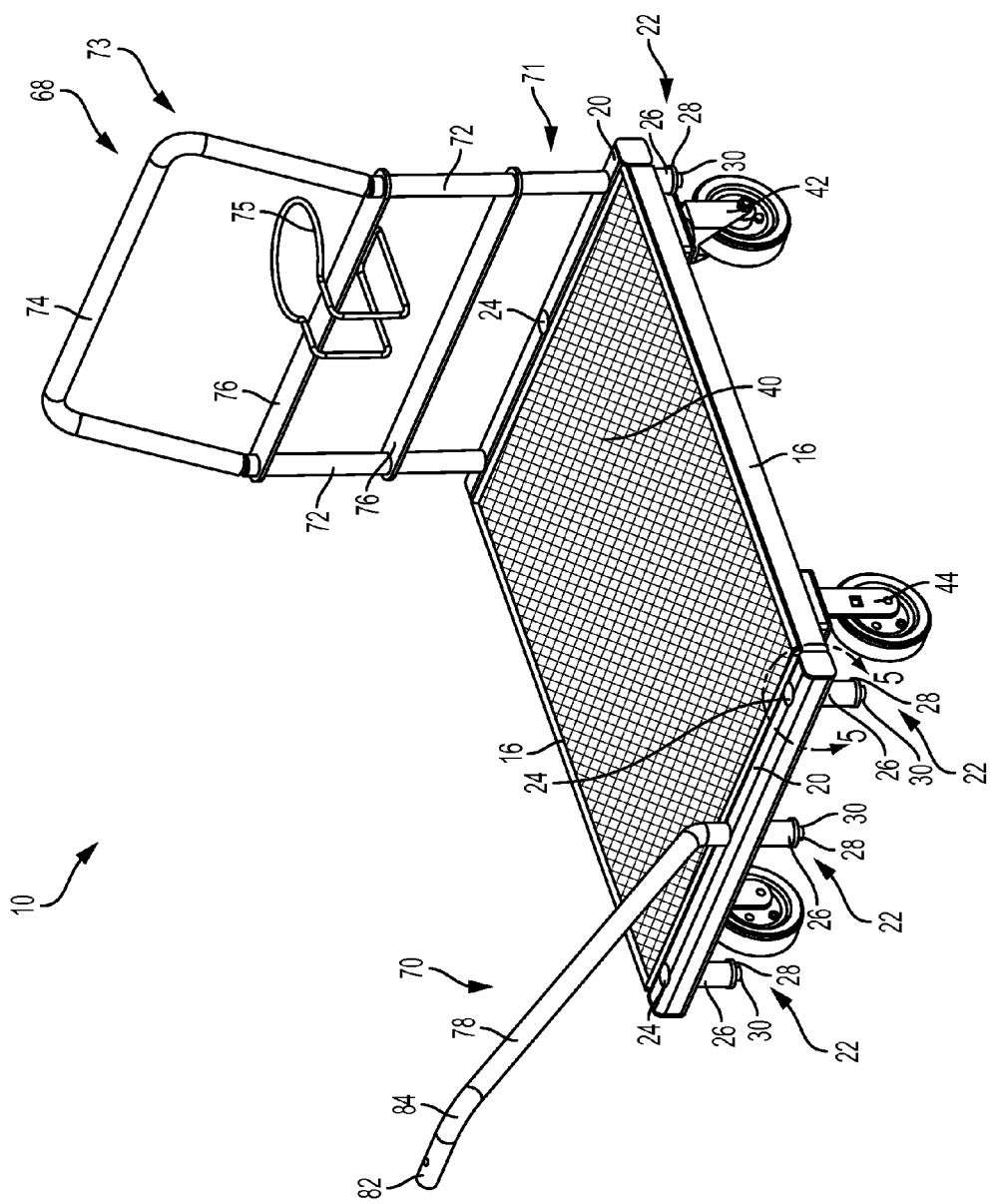
FIG. 9 depicts an exemplary embodiment of a modular cart.

FIG. 9 depicts an additional exemplary embodiment of a modular cart 10. The modular cart 10 includes the cart base 14 as described above. To the cart base 14 are exemplarily secured a wagon module 70 and a flat cart module 68. While the modular cart 10 depicted in FIG. 9 depicts simultaneous use of a wagon module 70 and a flat cart module 68, it will be recognize that in other embodiments, the modular cart 10 may be configured with only one of these modules or with two of the same modules.

The flat cart module 68 is depicted in further detail in FIG. 11. The flat cart module 68 includes a pair of generally vertical handles 72 including lower ends 71 and upper ends 73. The upper ends 76 of the vertical handles 72 are attached to a cross bar 74 configured to be gripped by the user when the modular cart 10 is being pushed. The lower ends 71 of the handles 72 comprise shanks 53 inserted into the receiver assemblies 22 at the end cap 20 of the cart base 14 in the manner as described above. One or more braces 76 further extend between the handles 72 of the flat cart module 68. It is to be noted through the exemplary embodiment of the flat cart module 68, that the flat cart modules 68 can be configured such as to simultaneously engage more than one, and exemplarily two, receiver assemblies 22 in the same end cap 20 with a corresponding number of shanks 53. The flat cart module 68 attachment to the cart base 14 is different from the previously described lumber rack cart module 12 in which the lower ends 52 of handles 50 simultaneously engage receiver assemblies 22 in different end caps 20 at the front and rear of the cart base 14. A wire form 75 may also be attached to a brace 76 of the modular cart 68. The wire form 75 is shaped to hold a variety of products including, but not limited, to beverages, paint cans, or caulking.

The wagon module 70 depicted in FIG. 9 is depicted in further detail in FIG. 10, and further includes the handle 78 discussed above. A shank 80 extends from the handle 78 and is slidingly inserted into a receiver assembly 22 located in an end cap 20. The handle 78 extends generally vertically from the cart base 14; however, it will be recognized that handle 78 may also be angled, as depicted in FIGS. 9 and 11. A grab bar 82 extends from an upper end 84 of the handle 78 and is exemplarily generally orthogonal to the handle 78. The grab bar 82 may also be excluded from certain embodiments of the wagon module 70 or positioned in a non-orthogonal orientation. A hinge may also be included with the wagon module 70 to allow handle 78 to move from an operational position to a storage position. It is to be noted that the exemplary embodiment of the wagon module 70 is exemplarily configured to be secured to the cart base 14 at a single receiver assembly 22. Once positioned in the receiver tube 26, the handle stop 28 prevents the lower end 80 from exiting the bottom of the receiver assembly 22. As discussed above, a hole in the handle stop 28 is configured to receive a screw 30 which can be used to securely fasten the base of the lower end 80 to the receiver assembly 22. In other additional embodiments, the wagon module may include two or more shanks extending from the handle 78. The two or more shanks may exemplarily be secured to the handle 78 by one or more braces (not depicted) as exemplarily described above with respect to FIGS. 4 and 8.

In embodiments, the receiver assembly 22 may further include a through hole 34 that is generally perpendicular to the receiver tube 26 and extends through the side of the receiver tube 26. The through hole 34 is configured to receive a detent pin 36 which engages a similarly located through hole 85 in the lower end 80 of the handle 78. The detent pin 36, when engaging both the receiver assembly 22 and the handle 78, secures the wagon module 70 to the receiver assembly 22 and limits rotation of the handle 78 within the receiver tube 26. In an exemplary embodiment, the detent pin 36 is secured to the end cap 20 with a tether 38, such that the detent pin 36 is not lost when not in use. In an alternative embodiments, the receiver assembly 22 may include a slotted through hole (not shown) that generally extends around the outer circumference of the receiver tube 26. In this embodiment, the slotted through hole is configured to receive a detent pin 36 and engages a similarly located through-hole 85 in the lower end 80 of the handle 78 allowing the wagon module 70 to swivel in the receiver assembly 22 about an angle at least partially defined by the slotted through hole.

Figure 12:
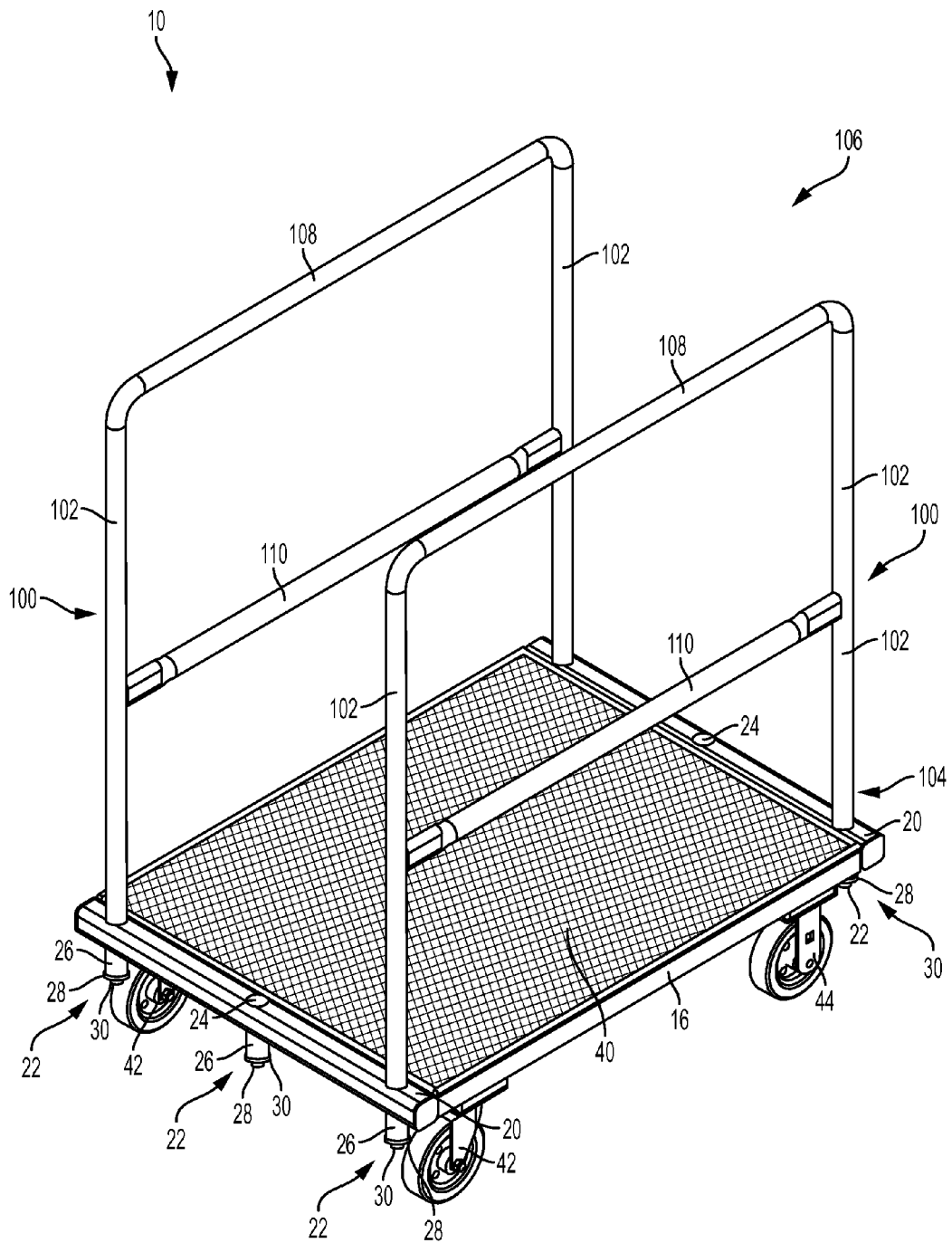
FIG. 12 depicts an additional exemplary embodiment of a modular cart.
Figure 13:
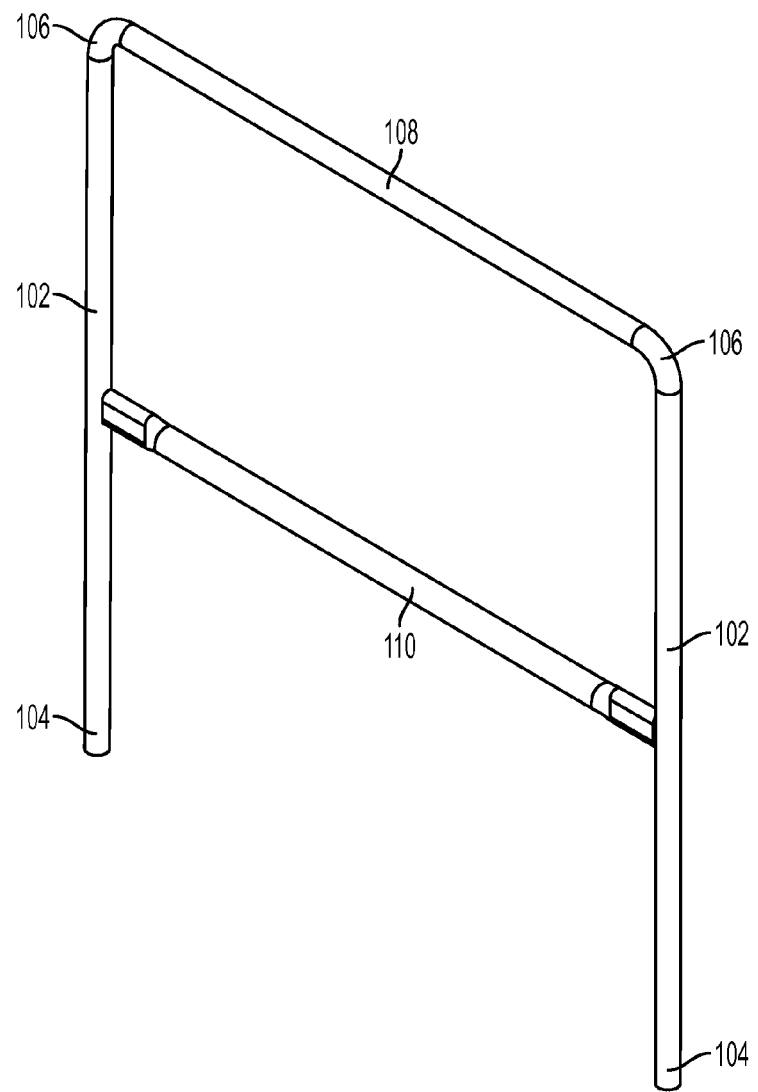
FIG. 13 depicts an exemplary embodiment of a furniture rail module.

FIG. 12 depicts a still further additional embodiment of a modular cart 10. The modular cart 10 of FIG. 12 is exemplarily configured as a furniture cart. The modular cart 10 includes a cart base 14 as described above. Furniture rail modules 100 are secured to the cart base 14 at the end caps 20 of the cart base 14. The furniture rail module 100 includes a pair of handles 102 having lower end 104 and upper end 106. A high bar 108 is connected to the upper ends 106 of the handles 102. Similarly, a low bar 110 is attached to both handles 102 between the lower end 104 and upper end 106 of the handles 102. The high bar 108 is generally grasped by the user, and the low bar 110 prevents furniture or other articles from exiting the side of the modular cart 10 on the sides. As depicted in FIG. 30, two furniture rail modules 100 are attached to a cart base 14 through the receiver assemblies 22 on the end caps 20. Shanks 53 of respective handle 102 are inserted into the receiver assemblies 22 through the holes 24 of the receiver assemblies 22 of the cart base 14 and secured thereto as described above Referring back to FIG. 9 it will be appreciated that while the modular cart 10 depicted in FIG. 9 depicts simultaneous use of a flat cart module 68 and a wagon module 70, alternative configurations of the modular cart 10 may only use a single module at a time, exemplarily as depicted in FIGS. 1A-C. However, it will be recognized that, as depicted in FIG. 9, combinations of modules with a cart base 14 as provided in the present disclosure may be used in conjunction in order to further create configurations specialized for particular tasks or functions within the retail store setting. In a merely exemplary embodiment, a modular cart 10 in the configuration depicted in FIG. 9 may be exemplarily used for the transport of a particularly heavy or large load of goods wherein two people can combine efforts to move the goods. One person may use the flat cart module 68 to push the load while a second person pulls on the wagon module 70, to exemplarily pull the load and to steer the load. In another merely exemplary embodiment, a modular cart 10 in a configuration depicted in FIG. 18 may be exemplarily used for the transport of a particularly heavy or large load of goods wherein two people can combine efforts to move the goods through use of two flat cart modules 68 on either end caps 20 of the cart base 14. As such configurations may not be frequently used, it is unlikely that a retail store facility would make an investment in such a specialized cart; however, in situations wherein such a configuration is advantageous, a modular cart may be assembled in this, or in other specialized configuration, with relative ease and speed thus capturing the benefit of the exemplary specialized cart configuration.

Additionally, FIG. 1A depicts a modular cart 10 of a still further configuration, using a shopping cart configuration, wherein one or more baskets 86 are secured to handles 88 including a lower end 89. Shanks (not depicted) as described above at the lower ends 89 are in turn secured into receiver assemblies 22 of the cart base 14 as previously described. A cross bar 87 connects the handles 88 and is generally grasped by the user. In an exemplary embodiment, the handles 88 may be part of a flat cart module 68 and the baskets 86 are configured to be removably secured to the flat cart module 68. In as still further embodiment, the baskets 86 are fixably secured to the handles 88 in a separate shopping cart module 90.

A technology interface 92 may be secured to one or more types of cart modules. The technology interface 92 is exemplarily configured to hold a mobile computing device, exemplarily a smart phone or tablet computer. In still further embodiments, the technology interface 92 further includes a power source (not depicted) for such mobile computing device as well as wireless communication thereto such that store information, product information, or promotional notices may be presented to the customer while the customer moves about the retail store facility.

Figure 2A:
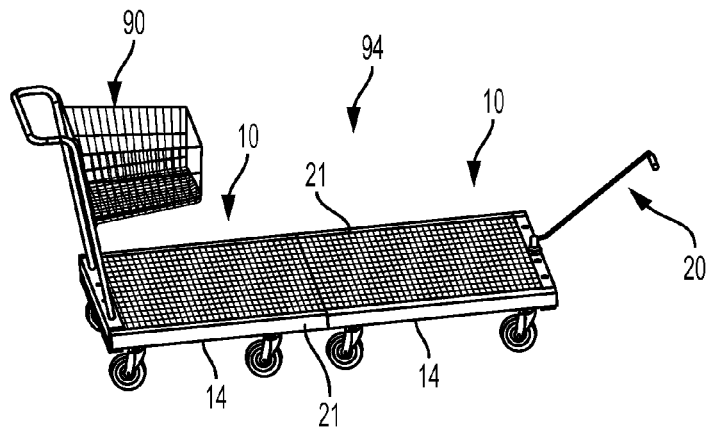
FIGS. 2A-B depict an exemplary embodiment of a connectable modular cart.
Figure 2B:
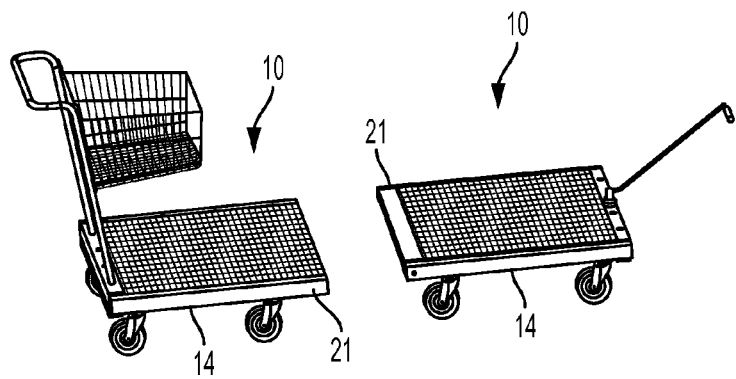

FIGS. 2A and 2B depict an additional exemplary embodiment of modular carts 10. In such an embodiment, the same cart bases 14 as described above may further be configured to connect end-to-end such that two or more cart bases 14 may be secured together to create a combined modular cart 94 of greater cart size and with any exemplarily cart modules. FIGS. 2A and 2B depict a shopping cart module 90 and a wagon module 70. In an exemplary embodiment, respective mating end caps 21 of the cart bases 14 are configured for a mating engagement. Exemplarily, each cart base 14 may include one of each of the respective mating components such that each cart bases 14 can be secured end-to-end with another respective cart base 14. Cart bases 14 may be secured to one another by pins, dips, bolts, or other connections that are not intending to be limiting on the scope of the ways in which cart bases may connect to one another. In an additional exemplary embodiment, one or more connectors that include two shanks connected by a brace may engage and be secured to receiver assemblies or two respective cart bases.

Figure 3A:
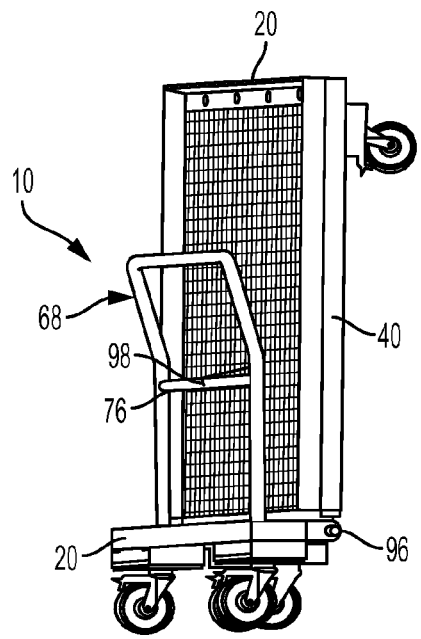
FIGS. 3A-B depict an exemplary embodiment of a foldable modular cart.
Figure 3B:
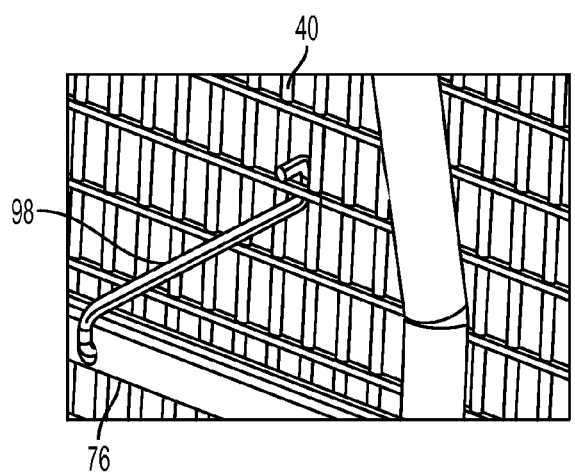

FIGS. 3A and 3B depict a further exemplary embodiment of a modular cart 10. In the exemplary embodiment depicted in FIG. 3A, the cart base 14 further includes a hinged portion 96 separating one end cap 20 and at least one set of wheels from the platform 40, other end cap 20, and at least a second set of wheels. In an embodiment, a set of wheels are a pair of corresponding arranged wheels. In an exemplary embodiment, a foldable cart base facilitates storage of modular carts 10 when not in use. In an exemplary embodiment, a hook 98 which is exemplary secured to the brace 76 of a flat cart module 68 secures to the platform 40 to hold the platform 40 in the folded position. This is exemplarily depicted in the close up of FIG. 3B.

Embodiments of the modular cart as disclosed herein have been discovered by the inventors to provide certain advantages over currently available systems known in the art. The modular reconfiguration of the carts enables an exemplary retail store facility to reconfigure its cart stock with current cart needs for specialty carts rather than storing a wide variety of single purpose carts when these carts are not in use. Specific examples may include wagon cart configurations which are typically used with lawn and garden goods, which is a seasonal product. Therefore, these specialty carts are only typically used during half of the year while the other half of the year these carts must be stored. By implementing embodiments as disclosed herein, cart bases may be configured into wagon carts during the planting or garden season while the cart bases are reconfigured to flat cart configurations, shopping cart configurations, or lumber cart configurations during the other six months rather than storing single purpose wagon carts. In a still further exemplary embodiment, construction or building materials may be cyclical in demand and therefore periods of high demand or business for construction materials may be met by configuring cart bases to include lumber rack cart modules such that more of this specialty cart configuration are available for customers, improving customer experience.

It has further been recognized that the modular nature of the modular carts facilitates maintenance, repair, and refurbishing carts has modular components can be replaced as needed and the cart bases are of a size and configuration which facilitates refurbishing of the cart bases.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A modular cart, comprising:
   a cart frame comprising a top, a bottom, a front end cap, and a rear end cap;
   a platform secured to the top of the cart frame;
   a plurality of wheels secured to the bottom of the cart frame; and
   a cart module that comprises at least one handle comprising a lower end and an upper end, and a shank at the lower end, the shank being removably secured within a receiver assembly of a plurality of receiver assemblies, and at least one receiver assembly of the plurality of receiver assemblies is secured to each of the front and rear end caps, and each of the plurality of receiver assemblies comprises a receiver tube and a handle stop secured to a lower most portion of the receiver tube and the handle stop comprising a through hole configured to receive a screw that threadingly engages the shank to removably secure the shank of the handle within the receiver tube of the receiver assembly.

2. The modular cart of claim 1, wherein the at least one handle of the cart module is two handles and a lower end of each handle comprises a shank, and the two handles are connected by a bar extending between the upper ends of the two handles, both shanks of the cart module removably secured within two respective receiver assemblies secured to one end cap of the front and rear end caps.

3. The modular cart of claim 1, wherein the at least one handle of the cart module is two handles and a lower end of each handle comprises a shank, and the two handles are connected by a bar extending between the upper ends of the two handles, and one shank is removably secured within the receiver assembly secured to the front end cap and the other shank is removably secured within the receiver assembly secured to the rear end cap.

4. A modular cart comprising:
   a cart frame comprising a top, a bottom, a front end cap, and a rear end cap;
   a platform secured to the top of the cart frame;
   a plurality of wheels secured to the bottom of the cart frame; and
   a cart module that comprises at least one handle comprising a lower end and an upper end, and a shank at the lower end, the shank being removably secured within a receiver assembly of a plurality of receiver assemblies, at least one receiver assembly of the plurality of receiver assemblies is secured to each of the front end cap and rear end cap, and each of the plurality of receiver assemblies comprises a receiver tube and a handle stop secured to a lower most portion of the receiver tube of one of the plurality of receiver assemblies;
   wherein the first and second end caps comprise a plurality of through holes and a receiver assembly of the plurality of receiver assemblies is secured within each of the through holes in the first and second end caps.

5. The modular cart of claim 4 wherein three receiver assemblies are secured to each of the front and rear end caps.

6. The modular cart of claim 4, wherein at least two receiver assemblies are secured to the front end cap and at least two receiver assemblies are secured to the rear end cap:
   wherein the cart module is a first cart module, and further comprising a second cart module; and
   wherein the first and second cart modules each comprise two handles connected at upper ends of the handles by cross bars, and lower ends of the handles comprise shanks, each of the shanks removably secured to a respective one of the receiver assemblies.

7. The modular cart of claim 4, wherein the at least one handle of the cart module is two handles and a lower end of each handle comprises a shank, and the two handles are connected by a bar extending between the upper ends of the two handles, both shanks of the cart module removably secured within two respective receiver assemblies secured to one end cap of the front and rear end caps.

8. The modular cart of claim 4, wherein the at least one handle of the cart module is two handles and a lower end of each handle comprises a shank, and the two handles are connected by a bar extending between the upper ends of the two handles, and one shank is removeably secured within the receiver assembly secured to the front end cap and the other shank is removably secured within the receiver assembly secured to the rear end cap.

9. A modular cart comprising:
   a cart frame comprising a top, a bottom, a front end cap, and a rear end cap;
   a platform secured to the top of the cart frame;
   a plurality of wheels secured to the bottom of the cart frame; and
   a cart module that comprises two handles, a lower end of each handle comprises a shank and one shank is removably secured within a receiver assembly secured to the front end cap and one shank is removably secured within a receiver assembly secured to the rear end cap;
   wherein the cart module further comprises a bar extending between upper ends of the two handles, a lower brace and an upper brace extending away from each of the handles of the cart module, lower braces and the upper braces secured to a pair of high bar supports, lower ends of the high bar supports secured to the lower braces and upper ends of the high bar supports extending vertically past the cross bar extending between the upper ends of the two handles, the upper ends of the high bar supports connected by a high bar.

10. The modular cart of claim 9, wherein at least two receiver assemblies are secured to the front end cap at least two receiver assemblies are secured to the rear end cap;
    wherein the cart module is a first cart module, and further comprising a second cart module; and
    wherein the first and second cart modules each comprise two handles connected at upper ends of the handles by bars, and lower ends of the handles comprise shanks, each of the shanks removably secured to a respective one of the receiver assemblies.

11. A modular cart system comprising:
    a cart base comprising:
      a cart from extending between a front end cap and a rear end cap, the cart frame having a top and a bottom
      a platform secured to the top of the cart frame;
      a plurality of wheels secured to the bottom of the cart frame; and
      a plurality of receiver assemblies secured to each of the front end cap and the rear end cap; and
    a plurality of cart modules, each cart module of the plurality comprising at least one handle having a lower end and an upper end, a shank at the handle lower end and at least one member extending generally perpendicularly away from the upper end, wherein the shank is configured to be removably secured within a receiver assembly of the plurality of receiver assemblies;
    wherein the plurality of cart modules comprises a lumber rack module comprising:
    a first handle with a lower end and an upper end, the lower end comprising a first shank;
    a second handle with a lower end and an upper end, the lower end comprising a second shank;
    a low bar extending between the upper ends of the first handle and the second handle;
    lower braces extending away from each of the first handle and the second handle;
    upper braces extending away from each of the first handle and second handle;
    first and second high bar supports secured to the lower braces and the upper braces and extending vertically above the first and second handles; and
    a high bar extending between upper ends of the first and second high bar supports;
    wherein the first shank is removably secured to a receiver assembly secured to the first end cap and the second shank is removably secured to a receiver assembly secured to the second end cap.

12. The modular cart system of claim 11, wherein the plurality of cart modules comprises at least a flat cart module, a shopping cart module, a wagon module, and the lumber rack module, and at least one cart module of the plurality of cart modules is secured to the cart base by engagement between the shank of the at least one cart module and a receiver assembly of the plurality of receiver assemblies.

13. The modular cart system of claim 11, wherein the plurality of cart modules comprises a flat cart module comprising:
    a first handle with a lower end and an upper end, the lower end comprising a first shank;
    a second handle with a lower end and an upper end, the lower end comprising a second shank; and
    a cross bar secured between the upper ends of the first handle and the second handle;
    wherein the first shank and the second shank are removably secured within two respective receiver assemblies to one end cap of the front and rear end caps.

14. The modular cart system of claim 11, wherein the plurality of cart modules comprises a wagon module wherein the handle extends away from the shank at an angle relative to the shank, and the at least one member is a grab bar that extends from the upper end of the handle at an angle perpendicular to both the handle and the shank.

15. A modular cart system comprising:
    a cart base comprising:
      a cart from extending between a front end cap and a rear end cap, the cart frame having a top and a bottom
      a platform secured to the top of the cart frame;
      a plurality of wheels secured to the bottom of the cart frame; and
      a plurality of receiver assemblies secured to each of the front end cap and the rear end cap; and
    a plurality of cart modules, each cart module of the plurality comprising at least one handle having a lower end and an upper end, a shank at the handle lower end and at least one member extending generally perpendicularly away from the upper end, wherein the shank is configured to be removably secured within a receiver assembly of the plurality of receiver assemblies;
    wherein the plurality of cart modules comprises a lumber rack module comprising:
    a first handle with a lower end and an upper end, the lower end comprising a first shank;
    a second handle with a lower end and an upper end, the lower end comprising a second shank;
    a low bar extending between the upper ends of the first handle and the second handle;
    lower braces extending away from each of the first handle and the second handle;
    upper braces extending away from each of the first handle and second handle;
    first and second high bar supports secured to the lower braces and the upper braces and extending vertically above the first and second handles; and
    a high bar extending between upper ends of the first and second high bar supports;

wherein the first shank is removably secured to a receiver assembly secured to the first end cap and the second shank is removably secured to a receiver assembly secured to the second end cap;

wherein the plurality of cart modules comprises first and second furniture cart modules, each of the first and second furniture cart modules comprising:

a first handle with a lower end and an upper and, the lower end comprising a first shank;

a second handle with a lower end and an upper end comprising a second shank;

a high bar secured between the upper ends of the first handle and the second handle; and a low bar extending between the first handle and the second handle at a position between the first and second shanks and the high bar;

wherein the first furniture cart module is removably secured to the cart frame by removable engagement of the first and second shanks of the first furniture cart module with a respective receiver assembly secured to each of the first and second end caps, and removably engagement of the first and second shank of the second furniture cart module with a respective receiver assembly secured to each of the first and second end caps.

16. The modular cart system of claim 15, wherein the plurality of cart modules comprises a lumber rack module comprising:

a first handle with a lower end and an upper end, the lower end comprising a first shank;

a second handle with a lower end and an upper end, the lower end comprising a second shank;

a low bar extending between the upper ends of the first handle and the second handle;

lower braces extending away from each of the first handle and the second handle;

upper braces extending away from each of the first handle and second handle;

first and second high bar supports secured to the lower braces and the upper braces and extending vertically above the first and second handles; and a high bar extending between upper ends of the first and second high bar supports;

wherein the first shank is removably secured to a receiver assembly secured to the first end cap and the second shank is removably secured to a receiver assembly secured to the second end cap.

17. The modular cart system of claim 11, wherein the lower braces of the lumber rack module define a position of the lumber rack module relative to the cart base.

18. The modular cart system of claim 17, wherein the end caps each comprise three receiver assemblies comprising outer receiver assemblies located at ends of the end caps and a center receiver assembly therebetween, and the shanks are received within respective outer receiver assemblies ad the lower braces extend toward midline of the cart.

19. The modular cart of claim 11, wherein each of the plurality of receiver assemblies comprises:

a receiver tube; and wherein the first and second end caps comprise a plurality of through holes and a receiver assembly of the plurality of receiver assemblies is secured within each of the through holes in the first an second end caps, and wherein the at least one shank is removably secured with at least one receiver tube of the plurality of receiver assemblies.

* * * * *

UNITED STATES PATENT AND TRADEMARK OFFICE
CERTIFICATE OF CORRECTION

| | | |
|---|---|---|
| PATENT NO. | : 9,283,975 B2 | |
| APPLICATION NO. | : 14/645486 | |
| DATED | : March 15, 2016 | |
| INVENTOR(S) | : Travis McClanahan, David Klapper and Jason Butler | |

It is certified that error appears in the above-identified patent and that said Letters Patent is hereby corrected as shown below:

In the claims,

In claim 18, at column 14, line 21: the word "ad" should instead read "and."

In claim 19, at column 14, line 29: the word "an" should instead read "and."

Signed and Sealed this
Twenty-third Day of August, 2016

Michelle K. Lee
*Director of the United States Patent and Trademark Office*